US012752418B2

(12) United States Patent

Kobayashi et al.

(10) Patent No.: US 12,752,418 B2
(45) Date of Patent: Oct. 6, 2026

(54) ROBOT TOOL

(71) Applicant: SINTOKOGIO, LTD., Nagoya (JP)

(72) Inventors: Takumi Kobayashi, Aichi (JP); Shuhei Tomioka, Aichi (JP); Takuya Aikawa, Aichi (JP); Yoshifumi Takikawa, Aichi (JP)

(73) Assignee: SINTOKOGIO, LTD., Aichii (JP)

( * ) Notice: Subject to any disclaimer, the term of this patent is extended or adjusted under 35 U.S.C. 154(b) by 0 days.

(21) Appl. No.: 19/207,658

(22) Filed: May 14, 2025

(65) Prior Publication Data

US 2025/0367817 A1 Dec. 4, 2025

(30) Foreign Application Priority Data

Jun. 3, 2024 (JP) ................................ 2024-090151

(51) Int. Cl.
*B25J 15/00* (2006.01)
*B25J 9/00* (2006.01)
*B25J 11/00* (2006.01)
*B25J 13/08* (2006.01)
*B25J 19/00* (2006.01)

(52) U.S. Cl.
CPC ........... *B25J 9/0009* (2013.01); *B25J 11/005* (2013.01); *B25J 13/085* (2013.01); *B25J 19/0025* (2013.01)

(58) Field of Classification Search
CPC ...... B25J 9/0009; B25J 11/005; B25J 13/085; B25J 19/0025; B25J 9/0081; B25J 18/00
See application file for complete search history.

(56) References Cited

U.S. PATENT DOCUMENTS

| | | | | |
|---|---|---|---|---|
| 2018/0021900 | A1* | 1/2018 | Huang | B23P 19/066 700/114 |
| 2018/0333811 | A1* | 11/2018 | Maeda | B23P 19/06 |
| 2026/0042215 | A1* | 2/2026 | Murase | B25J 9/1687 |
| 2026/0061603 | A1* | 3/2026 | Kim | B25J 9/0087 |
| 2026/0070234 | A1* | 3/2026 | Conte | B25J 15/0616 |

FOREIGN PATENT DOCUMENTS

| | | |
|---|---|---|
| JP | 2019-188503 A | 10/2019 |

* cited by examiner

*Primary Examiner* — Masud Ahmed
(74) *Attorney, Agent, or Firm* — Harness, Dickey & Pierce, P.L.C.

(57) ABSTRACT

Provided is a robot tool capable of aligning a screw or a gauge with a screw hole even if a position and angle of a screw mating surface are slightly shifted. A robot tool includes: a shaft member provided with, at at least one end thereof, a gauge that inspects a diameter of a screw hole or a bit that tightens and loosens a screw; a motor accommodating, in a cylindrical motor shaft thereof, the shaft member so that the shaft member is raisable and lowerable; a tubular guide that is disposed so as to enable the shaft member to be inserted thereinto and that has a tip to be brought into contact with a screw mating surface; and a force sensor configured to detect a moment applied from the screw mating surface to the guide when part of the tip of the guide is brought into contact with the screw mating surface.

8 Claims, 10 Drawing Sheets

ROBOT TOOL

This Nonprovisional application claims priority under 35 U.S.C. § 119 on Patent Application No. 2024-090151 filed in Japan on Jun. 3, 2024, the entire contents of which are hereby incorporated by reference.

TECHNICAL FIELD

The present invention relates to a robot tool attached to a tip portion of a robot arm.

BACKGROUND ART

Patent Literature 1 discloses a configuration of a screwing robot in which a screwdriver tool is attached to a tip of an articulated arm via a force sensor. The screwdriver tool has a cushion spring that constantly urges a bit so as to push the bit toward a workpiece. The force sensor is provided with the screwdriver tool, and is configured to detect a load including the weight of the screwdriver tool and transmit the load to a controlling means as appropriate.

CITATION LIST

Patent Literature

[Patent Literature 1]

Japanese Patent Application Publication Tokukai No. 2019-188503

SUMMARY OF INVENTION

Technical Problem

For such a screwing robot, an accurate teaching operation is needed in order to accurately align positions of a screw hole and a screw. Even in a case where teaching is carried out, the screw is shifted or inclined with respect to the screw hole due to a slight shift in a position and an angle of a screw mating surface, thereby making it impossible to tighten a screw. Such a problem may arise not only in the screwing robot but also in an inspection robot that inspects whether or not a screw hole satisfies a predetermined condition by screwing a threaded bit into the screw hole.

An aspect of the present invention has been made in light of the foregoing problem, and it is an object thereof to provide a robot tool that can align a screw or a gauge with a screw hole, even if a position and an angle of a screw mating surface are slightly shifted.

Solution to Problem

In order to solve the foregoing problem, a robot tool in accordance with an aspect of the present invention includes: a shaft member provided with, at at least one end thereof, a gauge configured to inspect a diameter of a screw hole or a bit configured to tighten and loosen a screw; a motor accommodating, in a motor shaft thereof that has a cylindrical shape, the shaft member so that the shaft member is raisable and lowerable; a guide that is disposed so as to enable the shaft member to be inserted thereinto and that has a tip to be brought into contact with a screw mating surface, the guide having a tubular shape; and a force sensor configured to detect a moment applied from the screw mating surface to the guide when part of the tip of the guide is brought into contact with the screw mating surface.

Advantageous Effects of Invention

According an aspect of the present invention, even if an angle of a screw mating surface is slightly shifted, a shaft member is set at a predetermined angle with respect to the screw mating surface by reducing a moment applied from the screw mating surface to a tip of a guide to nearly zero via a force sensor. For example, it is possible to make them orthogonal to each other. As a result, the screw hole can be searched for with use of the shaft member by sliding the tip of the guide on the screw mating surface via a tip portion of a robot arm. Further, it is possible to align a screw or a gauge with a screw hole by detecting that the tip of the screw or the gauge has arrived at the screw hole, with use of a force sensor.

DESCRIPTION OF EMBODIMENTS

Embodiment

With reference to FIGS. 1 to 11, the following description will discuss an embodiment of the present invention.

[Schematic Configuration of Robot 100]

Figure 1:
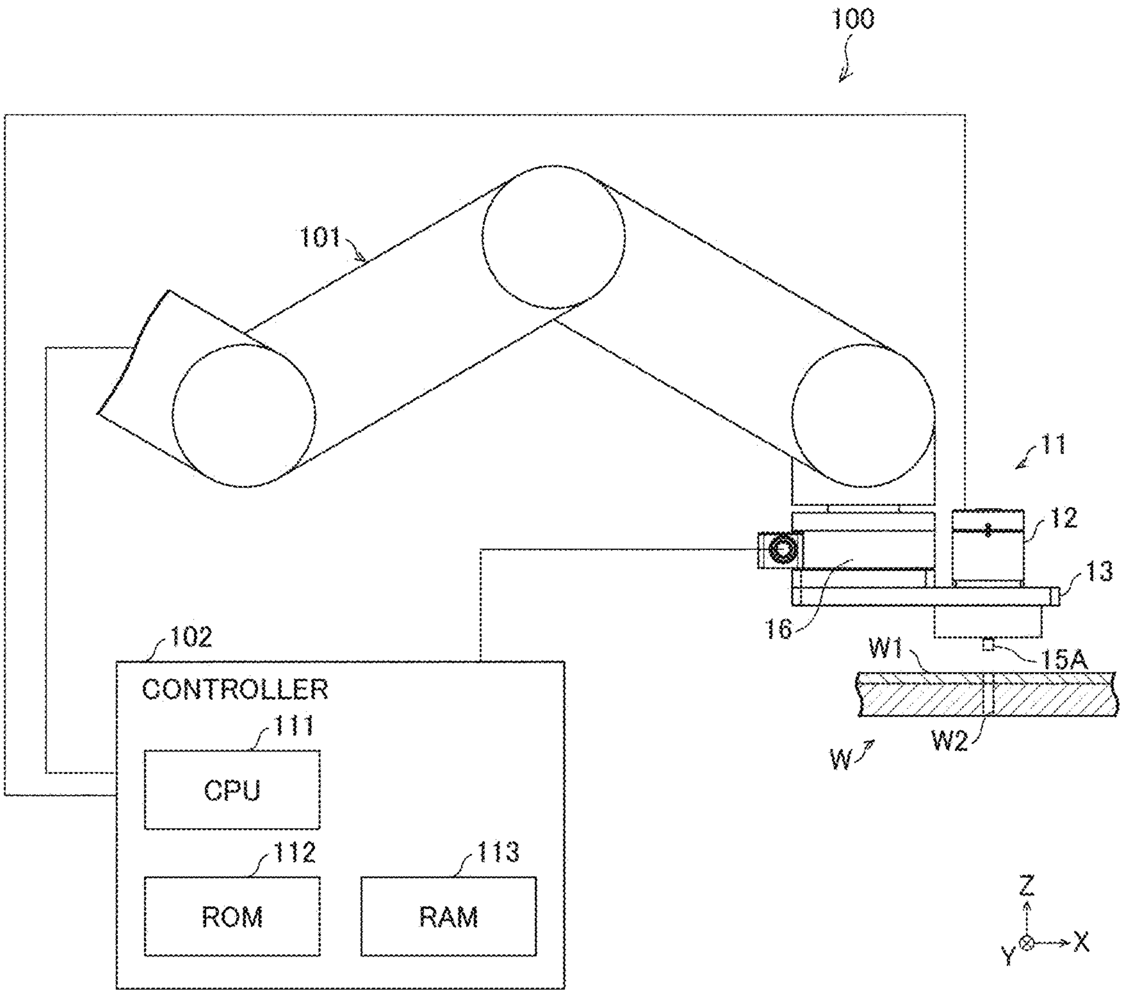
FIG. 1 is a view illustrating one example of a schematic configuration of a robot using a robot tool in accordance with an embodiment of the present invention.

With reference to FIG. 1, the following description will discuss a schematic configuration of a robot 100 using a robot tool 11 in accordance with an embodiment of the present invention. FIG. 1 is a view illustrating one example of a schematic configuration of the robot 100 using the robot tool 11 in accordance with an embodiment of the present invention. FIG. 1 illustrates an X-axis direction, a Y-axis direction, and a Z-axis direction that are orthogonal to each other. The X-axis direction and the Y-axis direction are thus two orthogonal directions that form a plane to which the Z-axis direction is normal. The Z-axis direction is a direction parallel to a motor shaft 12A (illustrated in FIG. 3) of a motor 12 included in the robot tool 11 and, a direction upward from a base plate 13 is regarded as a Z-axis positive direction. Note that in a case where a direction is mentioned, the illustrated direction arrow is referred to (the same applies to the other drawings).

As illustrated in FIG. 1, the robot 100 is configured to be able to fit a columnar gauge 15A for inspecting a diameter of a screw hole into a screw hole W2 formed on a screw mating surface W1 of a workpiece W as described later. The robot 100 includes a robot arm 101, the robot tool 11 attached to a tip portion of the robot arm 101, and a controller 102. The robot arm 101 is an articulated arm made up of a plurality of arms coupled to each other.

The controller 102 includes a central processing unit (CPU) 111, a read only memory (ROM) 112, and a random access memory (RAM) 113 that are connected to each other via a bus. To the controller 102, the motor 12 and a force sensor 16 that are included in the robot tool 11; and the robot arm 101 are electrically connected.

The ROM 112 stores, for example, a program for the CPU 111 to control various operations. The controller 102 controls, for example, the motor 12 and the robot arm 101 in accordance with a detection signal inputted from the force sensor 16 as described later, on the basis of the control program read from the ROM 112. The RAM 113 is used as a storage area for temporarily storing, for example, data and signals used when the CPU 111 carries out the above program or as a work area for data processing.

[Schematic Configuration of Robot Tool 11]

Figure 2:
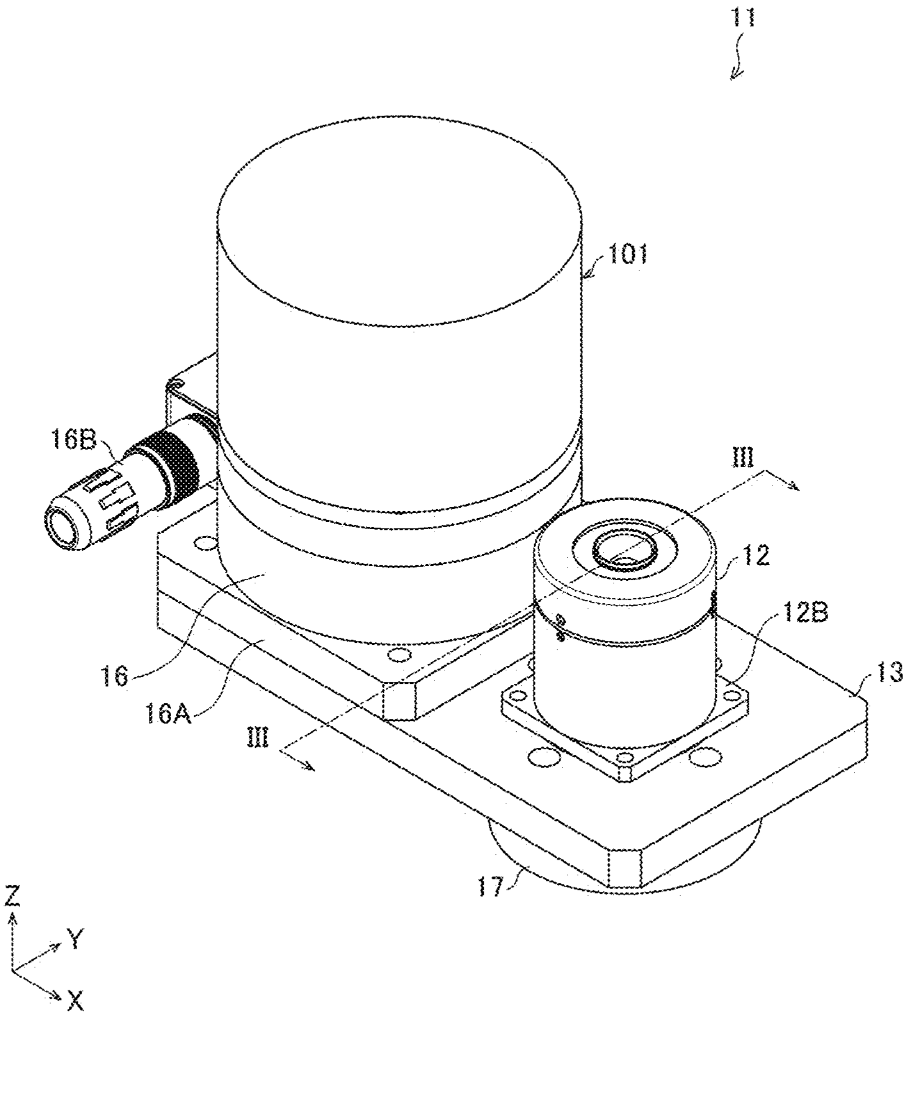
FIG. 2 is a perspective view illustrating the robot tool in FIG. 1 as seen from above.
Figure 3:
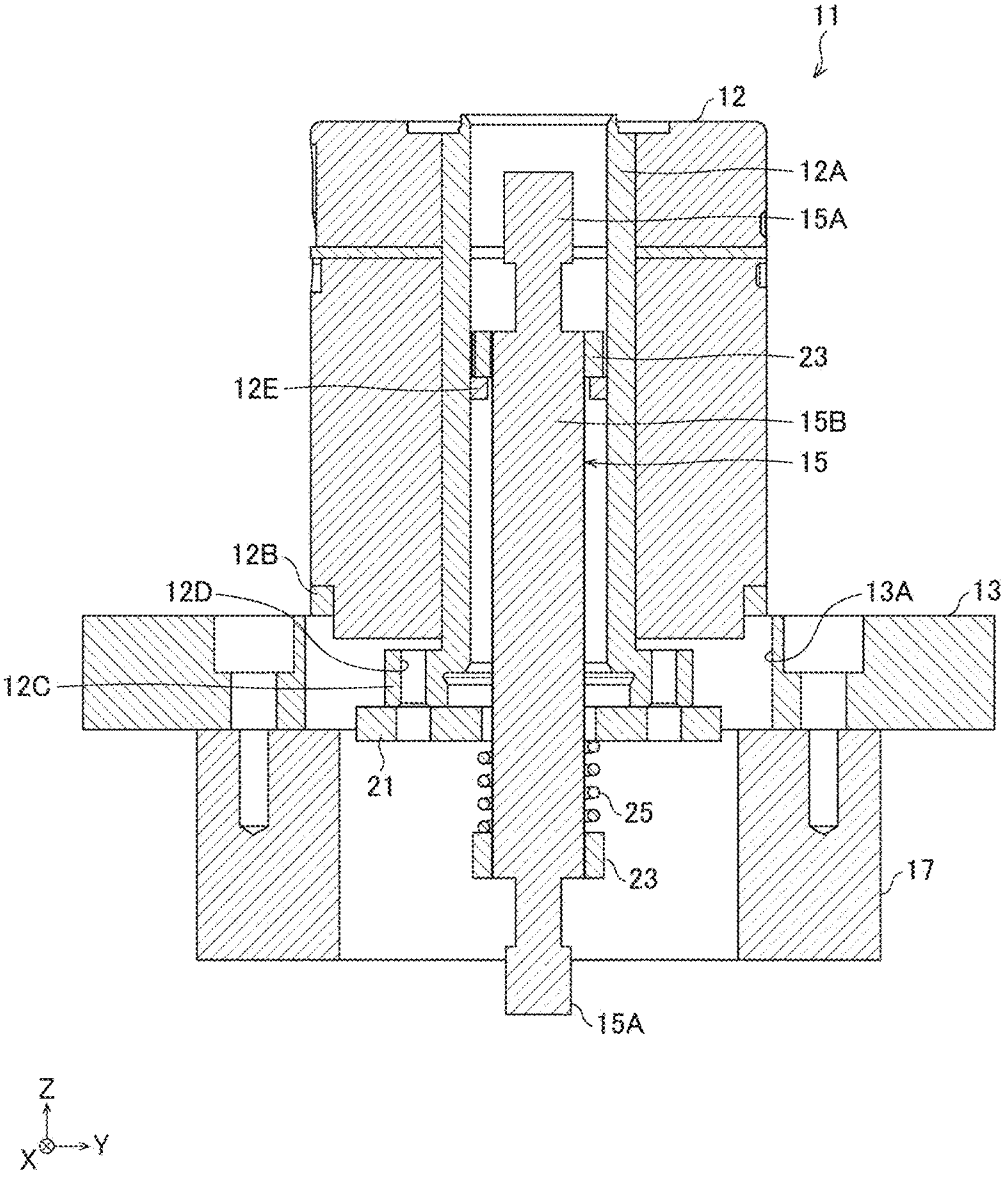
FIG. 3 is a cross-sectional view taken along III-III line of FIG. 2.
Figure 4:
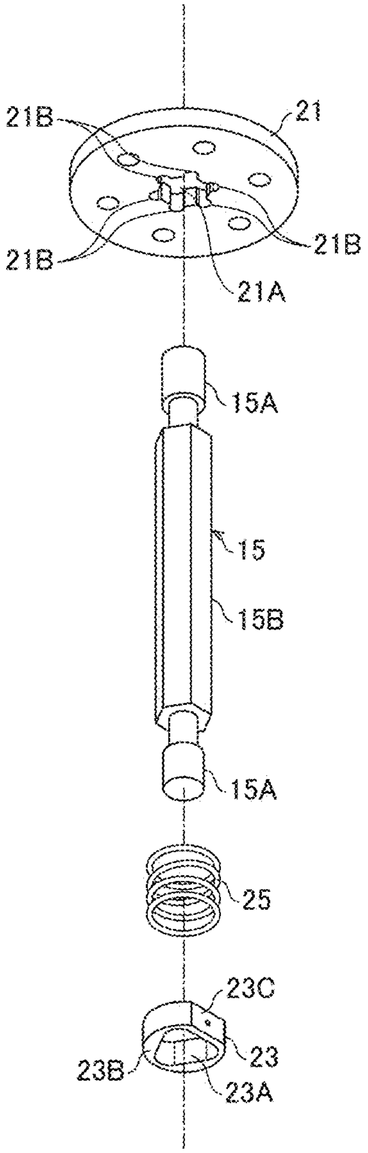
FIG. 4 is an exploded perspective view illustrating stoppers, a compression coil spring, a gauge shaft, and a support plate which are illustrated in FIG. 3.
Figure 5:
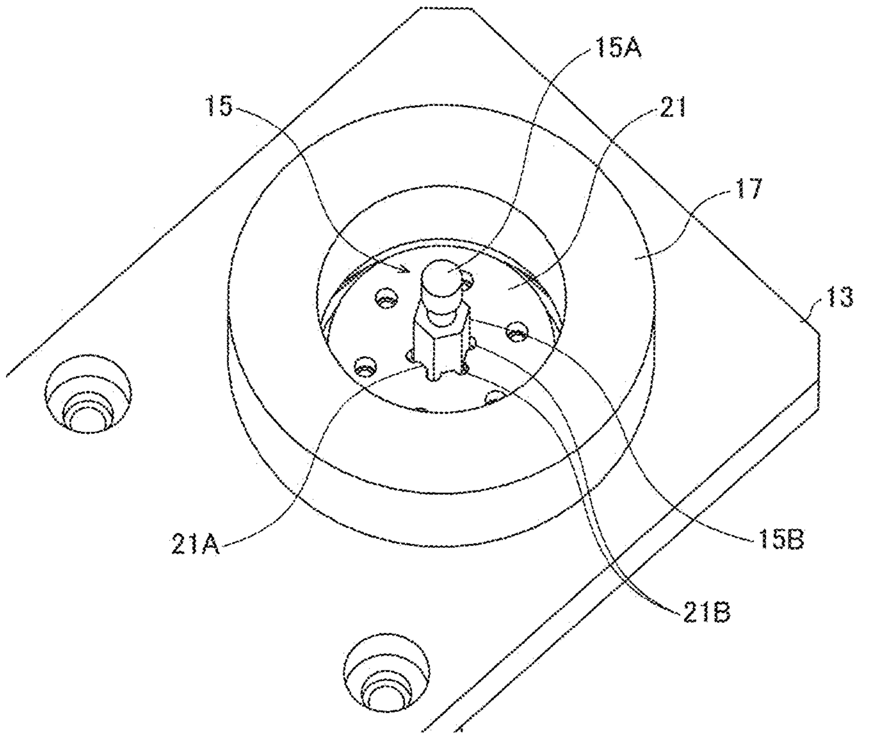
FIG. 5 is an enlarged perspective view illustrating the guide in FIG. 3 as seen from below, from which the stopper on a lower side and the compression coil spring are removed.

Next, with reference to FIGS. 2 to 5, the following description will discuss a schematic configuration of the robot tool 11 attached to the tip portion of the robot arm 101. FIG. 2 is a perspective view illustrating the robot tool 11 in FIG. 1 as seen from above. FIG. 3 is a cross-sectional view taken along III-III line of FIG. 2. FIG. 4 is an exploded perspective view illustrating stoppers 23, a compression coil spring 25, a gauge shaft 15, and a support plate 21 which are illustrated in FIG. 3. FIG. 5 is an enlarged perspective view illustrating a guide 17 in FIG. 3 as seen from below, from which the stopper 23 on a lower side and the compression coil spring 25 illustrated in FIG. 3 are removed.

As illustrated in FIG. 2 and FIG. 3, the robot tool 11 includes, for example, the motor 12, the base plate 13, the gauge shaft 15, the force sensor 16, and the guide 17. As illustrated in FIG. 2, the base plate 13 is formed into a rectangular shape in a plan view which has substantially the same short side as one side of an attachment plate 16A of the force sensor 16, the attachment plate 16A having a substantially square shape in a plan view. Note that the longer side direction of the base plate 13 is regarded as the X-axis direction, and the shorter side direction of the base plate 13 is regarded as the Y-axis direction.

The force sensor 16 is fixed, through fitting of screws, on an upper surface of the base plate 13, that is, on a one end side in a longer side direction on a surface of the base plate 13 which surface is located opposite to a screw mating surface W1 side, via the attachment plate 16A attached to a lower end surface of the force sensor 16. The upper end portion of the force sensor 16 is attached to the tip portion of the robot arm 101.

The force sensor 16 is a six-axis force sensor that detects force components FX, FY, and FZ in three axial directions of the X-, Y-, and Z-axes that act on the robot tool 11 and moment components MX, MY, and MZ about the three X-, Y-, and Z-axes as rotation axes that act on the robot tool 11. The force sensor 16 outputs, to the controller 102 electrically connected thereto via a connector 16B thereof, detection signals of the detected force components FX, FY, and FZ and the detected moment components MX, MY, and MZ. In a case where it is unnecessary to distinguish between the directions, the force components FX, FY, and FZ are collectively referred also as “force F”, and the moment components MX, MY, and MZ are collectively referred also as “moment M”.

As illustrated in FIG. 2 and FIG. 3, a circular through hole 13A through which the cylindrical motor shaft 12A of the motor 12 protrudes downward, that is, protrudes toward the screw mating surface W1 side is formed in a substantially center part of an approximately half portion of the upper surface of the base plate 13, the half portion being located on a side opposite in a longer side direction from the force sensor 16. The motor 12 is fixed through fitting of screws so that the motor shaft 12A is located substantially at the center of the through hole 13A via an attachment plate 12B attached to a lower end portion of the motor 12. The through hole 13A is one example of a first through hole.

The cylindrical guide 17 having a tip (lower end in FIG. 3) to be brought into contact with the screw mating surface W1 of the workpiece W is fixed, through fitting of screws, on a lower surface of the base plate 13, that is, on a surface of the base plate 13 which surface is located on the screw mating surface W1 side so that the guide 17 is coaxial with the through hole 13A. The guide 17 does not necessarily have a circular cross section and may be formed into a tubular shape having a cross section with a polygonal shape, such as a quadrangular or hexagonal shape.

As illustrated in FIG. 3, the motor shaft 12A is formed to have a cylindrical shape, and has a ring-shaped flange portion 12C extending by a predetermined length, e.g., approximately 5 mm to 7 mm outwardly in a radial direction from the tip portion (lower end portion in FIG. 3) of the motor shaft 12A. The flange portion 12C is provided with, for example, six screw holes 12D formed at equal intervals in a circumferential direction. In the flange portion 12C, a disc-shaped support plate 21 that transmits rotation of the motor shaft 12A to the gauge shaft 15 is fixed to the screw holes 12D through fitting of screws.

As illustrated in FIG. 3 and FIG. 4, the gauge shaft 15 accommodated in the cylindrical motor shaft 12A is made up of a shaft portion 15B having a hexagonal cross section and paired columnar gauges 15A formed at both ends of the shaft portion 15B so as to be coaxial. The diameter of the gauge 15A is set to be smaller than that of the inscribed circle of the cross section of the shaft portion 15B. The paired gauges 15A are each configured to be inserted into the screw hole W2 formed in the workpiece W to determine a size of the hole diameter. The gauge shaft 15 is one example of a shaft member.

As illustrated in FIG. 4, a hexagonal through hole 21A into which the shaft portion 15B of the gauge shaft 15 is fitted is formed in the center position of the support plate 21, and clearance grooves 21B each having a U-shaped cross section are formed at the respective corner portions of the through hole 21A throughout the thickness of the support plate 21. This allows the shaft portion 15B of the gauge shaft 15 to be fitted into the through hole 21A of the support plate 21, as illustrated in FIG. 4 and FIG. 5, so that the gauge shaft 15 is accommodated in the motor shaft 12A so as to be raisable and lowerable and be coaxial with the motor shaft 12A. The corner portions of the shaft portion 15B having a hexagonal cross section are disposed in the respective clearance grooves 21B, so that it is possible to prevent a situation where the corner portions of the shaft portion 15B collide with an inner peripheral surface of the through hole 21A thereby making insertion of the shaft portion 15B impossible. The through hole 21A is one example of a second through hole.

The cross-sectional shape of the shaft portion 15B and the shape of the through hole 21A are not limited to a hexagonal shape but may be, for example, quadrangular, pentagonal, and octagonal shapes. Further, the clearance grooves 21B having U-shaped cross sections may be formed at the respective corner portions of the through hole 21A.

As illustrated in FIG. 3 and FIG. 4, the substantially ring-shaped stoppers 23 are detachably attached to respective both end portions of the shaft portion 15B of the gauge shaft 15. The stoppers 23 are provided with, on an axially outer side thereof, respective wall portions 23B having substantially triangular through holes 23A into which the respective gauges 15A can be inserted and into which the shaft portion 15B is fitted so as to be coaxial with the stoppers 23. The outer diameter of the stopper 23 is substantially the same dimension as that of the inner diameter of the cylindrical motor shaft 12A.

Further, each stopper 23 is provided with a flat surface 23C formed in part of the outer periphery thereof. The flat surface 23C has a small through screw hole. The stopper 23 is fixed to the shaft portion 15B by tightening an unillustrated setscrew into the through screw hole. As illustrated in FIG. 3, a ring-shaped retaining rib 12E with which the stopper 23 attached to the upper end portion of the shaft portion 15B of the gauge shaft 15 is to be brought into contact from above is provided in a predetermined position in an axial direction on the inner peripheral surface of the cylindrical motor shaft 12A.

Therefore, the stopper 23 is attached to the upper end portion of the shaft portion 15B of the gauge shaft 15 and is disposed in the motor shaft 12A, so that it is possible to prevent the gauge shaft 15 from being inclined with respect to the motor shaft 12A as well as to prevent the gauge shaft 15 from coming out of the through hole 21A of the support plate 21.

Further, as illustrated in FIG. 3, a configuration is employed in which when the stopper 23 attached to the upper end portion of the shaft portion 15B of the gauge shaft 15 is brought into contact with the retaining rib 12E, the gauge 15A on a lower side of the gauge shaft 15 further protrudes to an axially outer side than the lower end surface of the guide 17. As illustrated in FIG. 3 and FIG. 4, the compression coil spring 25 is inserted onto the shaft portion 15B between the stopper 23 attached to the lower end portion of the shaft portion 15B of the gauge shaft 15 and the support plate 21 to urge the gauge shaft 15 downward. Therefore, when the tip of the guide 17 is brought into contact with the screw mating surface W1 of the workpiece W, the gauge shaft 15 is urged toward the screw mating surface W1, and the gauge 15A on a lower side is pressed against the screw mating surface W1. The compression coil spring 25 is one example of an urging member.

[Schematic Configuration of Screwing Shaft 27]

Figure 6:
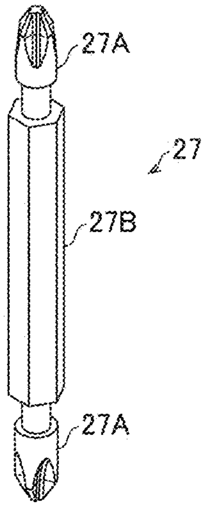
FIG. 6 is a perspective view illustrating one example of a screwing shaft.

Further, the robot tool 11 may be configured so that a screwing shaft 27 is mounted to the motor shaft 12A instead of the gauge shaft 15. With reference to FIG. 6, the following description will discuss a schematic configuration of the screwing shaft 27. FIG. 6 is a perspective view illustrating one example of the screwing shaft 27. The screwing shaft 27 is one example of a shaft member.

As illustrated in FIG. 6, the screwing shaft 27 has a shaft portion 27B having a hexagonal cross section having the same dimension as that of the cross section of the shaft portion 15B and paired bits 27A each for tightening a screw which are provided at the both end portions of the shaft portion 27B so as to be coaxial. The diameter of the bit 27A on a base end portion side is set to be smaller than the diameter of the inscribed circle of the cross section of the shaft portion 27B.

Therefore, the shaft portion 27B of the screwing shaft 27 is fitted into the through hole 21A of the support plate 21, so that the screwing shaft 27 is accommodated in the motor shaft 12A so as to be raisable and lowerable and be coaxial with the motor shaft 12A. The corner portions of the shaft portion 27B having a hexagonal cross section are disposed in the respective clearance grooves 21B, so that it is possible to prevent a situation where the corner portions of the shaft portion 27B collide with an inner peripheral surface of the through hole 21A thereby making insertion of the shaft portion 27B impossible. Further, the stopper 23 is attached to the upper end portion of the shaft portion 27B of the screwing shaft 27 and is disposed in the motor shaft 12A, so that it is possible to prevent the screwing shaft 27 from being inclined as well as to prevent the screwing shaft 27 from coming out of the through hole 21A of the support plate 21.

Further, a configuration is employed in which when the stopper 23 attached to the upper end portion of the shaft portion 27B of the screwing shaft 27 is brought into contact with the retaining rib 12E, the tip of the screw engaged with the bit 27A on a lower side of the screwing shaft 27 further protrudes to an axially outer side than the lower end surface of the guide 17. Further, the compression coil spring 25 is inserted onto the shaft portion 27B between the stopper 23 attached to the lower end portion of the shaft portion 27B of the screwing shaft 27 and the support plate 21 to urge the screwing shaft 27 downward.

Therefore, when the tip of the guide 17 is brought into contact with the screw mating surface W1 of the workpiece W, the screwing shaft 27 is urged toward the screw mating surface W1, and the screw engaged with the bit 27A on a lower side is pressed against the screw mating surface W1. While the screw engaged with the bit 27A on a lower side is fitted into the screw hole W2 of the screw mating surface W1, the controller 102 rotates the motor shaft 12A of the motor 12 to rotate the screwing shaft 27. As a result, the screw engaged with the bit 27A on a lower side is tightened into the screw hole W2 of the screw mating surface W1.

[Fitting Operation]

With reference to FIGS. 7 to 11, the following description will discuss one example of a fitting operation of fitting the gauge 15A of the robot tool 11 into the screw hole W2, the fitting operation being carried out by the controller 102 configured to control the robot 100 configured as above.

Figure 7:
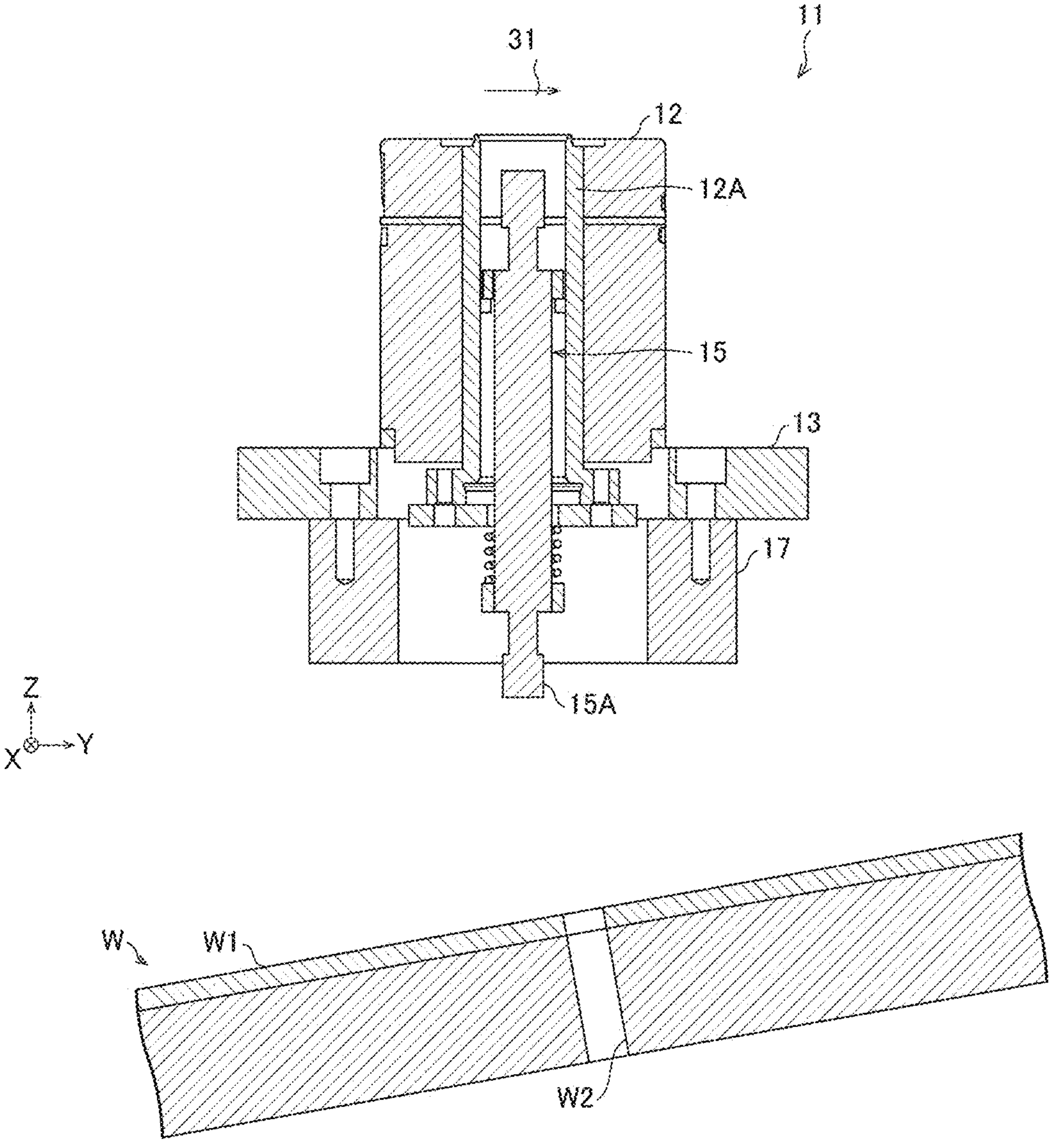
FIG. 7 is a view for explaining a first step of a fitting operation of fitting a gauge shaft into a screw hole with use of the robot tool illustrated in FIG. 1.
Figure 8:
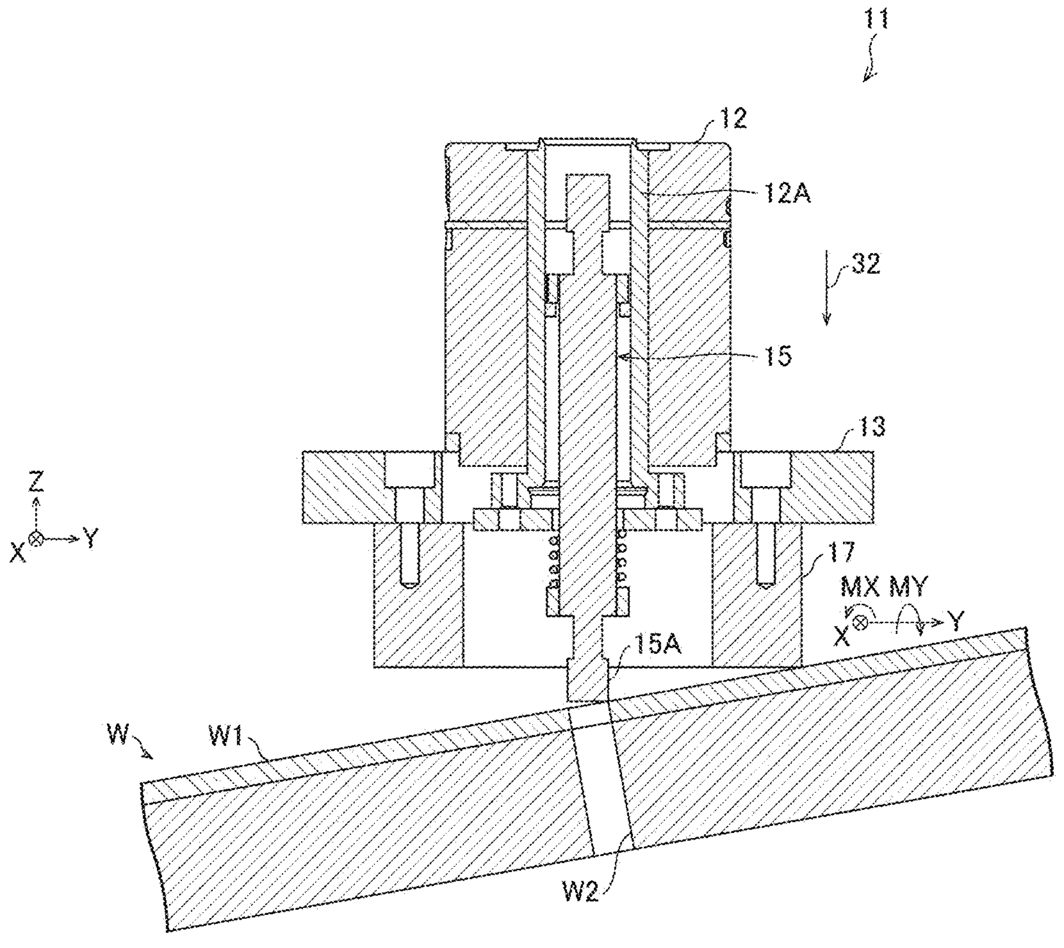
FIG. 8 is a view for explaining a second step of the fitting operation of fitting the gauge shaft into the screw hole with use of the robot tool illustrated in FIG. 1.
Figure 9:
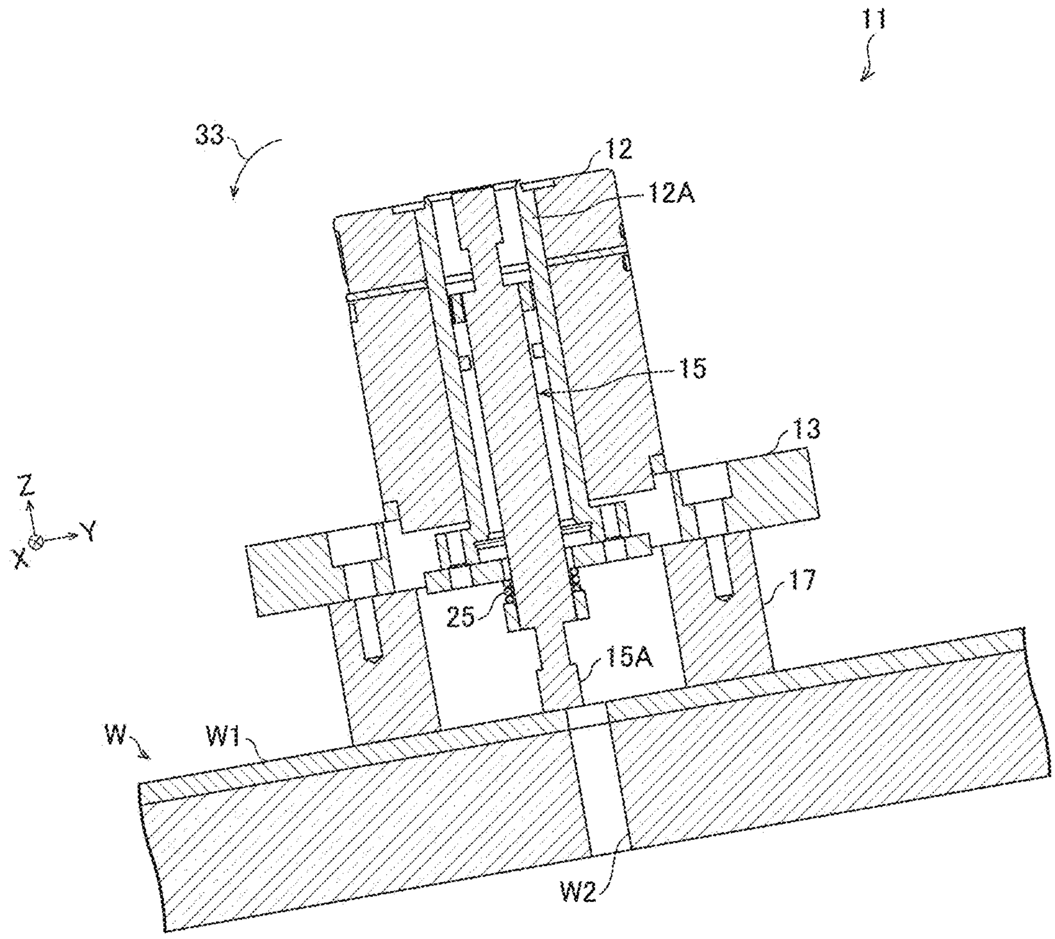
FIG. 9 is a view for explaining a third step of the fitting operation of fitting the gauge shaft into the screw hole with use of the robot tool illustrated in FIG. 1.
Figure 10:
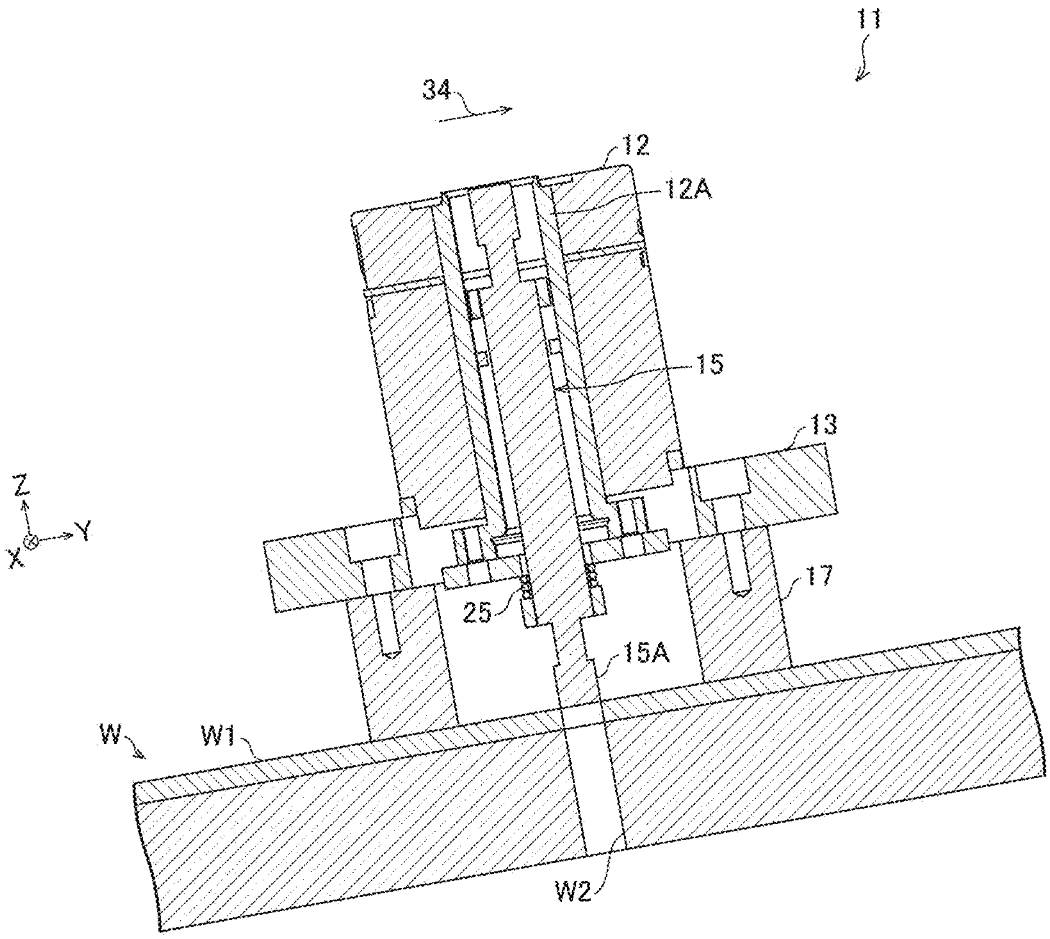
FIG. 10 is a view for explaining a fourth step of the fitting operation of fitting the gauge shaft into the screw hole with use of the robot tool illustrated in FIG. 1.
Figure 11:
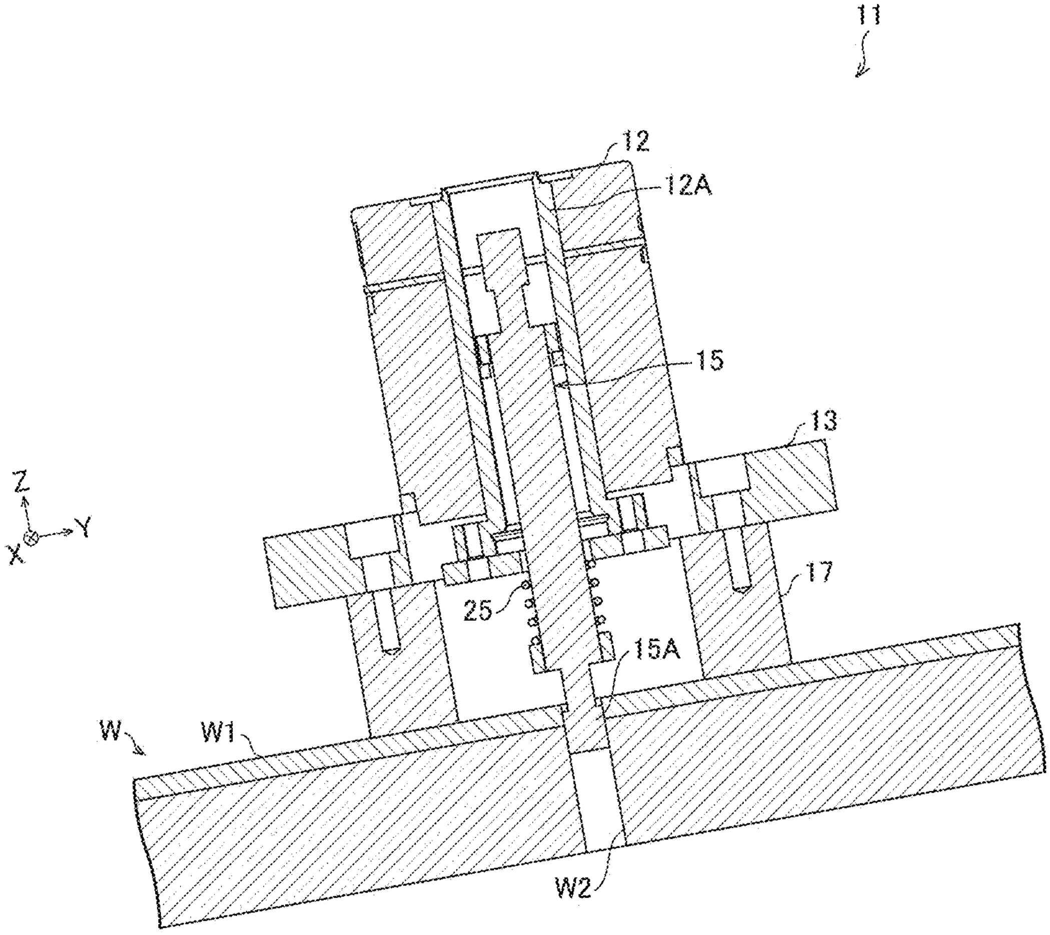
FIG. 11 is a view for explaining a fifth step of the fitting operation of fitting the gauge shaft into the screw hole with use of the robot tool illustrated in FIG. 1.

FIG. 7 is a view for explaining a first step of the fitting operation of fitting the gauge shaft 15 into the screw hole W2 with use of the robot tool 11. FIG. 8 is a view for explaining a second step of the fitting operation of fitting the gauge shaft 15 into the screw hole W2 with use of the robot tool 11. FIG. 9 is a view for explaining a third step of the fitting operation of fitting the gauge shaft 15 into the screw hole W2 with use of the robot tool 11. FIG. 10 is a view for explaining a fourth step of the fitting operation of fitting the gauge shaft 15 into the screw hole W2 with use of the robot tool 11. FIG. 11 is a view for explaining a fifth step of the fitting operation of fitting the gauge shaft 15 into the screw hole W2 with use of the robot tool 11.

[First Step]

As illustrated in FIG. 7, the controller 102 first operates the robot arm 101 to align the Z-axis direction, which is a direction parallel to the motor shaft 12A of the robot tool 11, with a vertical direction. Then, the controller 102 operates the robot arm 101 to move the gauge shaft 15 accommodated in the motor shaft 12A of the robot tool 11 to a position directly above the screw hole W2 of the workpiece W, that is, a position located in the Z-axis direction above the screw hole W2. For example, the controller 102 operates the robot arm 101 to move the robot tool 11 in a direction of the arrow 31.

In this case, the gauge shaft 15 of the robot tool 11 is aligned with the screw hole W2 by image recognition or a prior teaching operation. The shift in the position or angle of the screw mating surface W1 may occur between the gauge shaft 15 of the robot tool 11 and the screw hole W2 due to variations in the position of the workpiece W provided and errors in image recognition. That is, the gauge shaft 15 of the robot tool 11 and the screw hole W2 are not always positioned right opposite to each other. For example, as illustrated in FIG. 7, the screw mating surface W1 is inclined with respect to the horizontal plane.

[Second Step]

Subsequently, as illustrated in FIG. 8, the controller 102 operates the robot arm 101 to move the robot tool 11 in a Z-axis negative direction, that is, in a direction of the arrow 32. When the controller 102 detects, via the force sensor 16, the moment M applied from the screw mating surface W1 to the guide 17, the controller 102 determines that part of the tip of the guide 17 of the robot tool 11 has been brought into contact with the screw mating surface W1, and the controller 102 stops the robot arm 101. The controller 102 detects, via the force sensor 16, the moment components MX and MY about the X- and Y-axes as rotation axes that are applied from the screw mating surface W1 to the guide 17.

[Third Step]

While detecting the moment components MX and MY via the force sensor 16, the controller 102 operates the robot arm 101 so as to reduce the moment components MX and MY applied from the screw mating surface W1 to the guide 17 to nearly zero, as illustrated in FIG. 9. For example, the controller 102 rotates the robot tool 11 in a direction of the arrow 33.

As a result, the controller 102 has successfully brought the entire surface of the tip of the guide 17 into contact with the screw mating surface W1. Further, the gauge 15A on a lower side of the gauge shaft 15 is urged downward by the compression coil spring 25 and is pressed against the screw mating surface W1. The gauge shaft 15 is set to a state perpendicular to the screw mating surface W1, that is, a state parallel to the screw hole W2.

[Fourth Step]

Subsequently, as illustrated in FIG. 10, the controller 102 searches for the screw hole W2 by operating the robot arm 101 to, while bringing the entire surface of the tip of the guide 17 into contact with the screw mating surface W1, slide the tip on the screw mating surface W1 in, for example, a direction of the arrow 34. Specifically, the controller 102 determines that the tip of the gauge 15A has arrived at the screw hole W2 by detecting that a force F1 equal to or greater than a predetermined first threshold has occurred, via the force sensor 16.

[Fifth Step]

As illustrated in FIG. 11, when the controller 102 detects that the tip of the gauge 15A has arrived at the screw hole W2, the controller 102 stops the movement of the robot arm 101. As a result, the gauge 15A is fitted into the screw hole W2 by the urging force of the compression coil spring 25. Afterward, the controller 102 operates the robot arm 101 to, while bringing the entire surface of the tip of the guide 17 into contact with the screw mating surface W1, slightly slide the tip.

When the controller 102 detects a force F2 equal to or greater than a predetermined second threshold via the force sensor 16, the controller 102 determines that the gauge 15A has been fitted into the screw hole W2, and stops the robot arm 101. Afterward, the controller 102 operates the robot arm 101 to move the robot tool 11 in a Z-axis positive direction to take the gauge 15A out of the screw hole W2, and the controller 102 ends the fitting operation.

[Screwing Operation]

Next, the following description will discuss one example of a screwing operation of tightening a screw into the screw hole W2 with use of the screwing shaft 27 of the robot tool 11, the screwing operation being carried out by the controller 102 configured to control the robot 100 configured as above. First, in the robot tool 11 illustrated in FIG. 7, the screwing shaft 27 is set instead of the gauge shaft 15. Then, the screw head of a screw is engaged with the bit 27A on a lower side of the screwing shaft 27. The controller 102 operates the robot arm 101 to move the screwing shaft 27 of the robot tool 11 to a position located in the Z-axis direction above the screw hole W2 of the workpiece W.

Subsequently, the controller 102 operates the robot arm 101 to move the robot tool 11 in a Z-axis negative direction until part of the tip of the guide 17 of the robot tool 11 is brought into contact with the screw mating surface W1 (see FIG. 8). While detecting the moment components MX and MY via the force sensor 16, the controller 102 operates the robot arm 101 so as to reduce the moment components MX and MY applied from the screw mating surface W1 to the guide 17 to nearly zero (see FIG. 9).

As a result, the controller 102 has successfully brought the entire surface of the tip of the guide 17 into contact with the screw mating surface W1. Further, the screw engaged with the bit 27A on a lower side of the screwing shaft 27 is urged downward by the compression coil spring 25 and is pressed against the screw mating surface W1. The screwing shaft 27 and the screw engaged with the bit 27A are set to a state perpendicular to the screw mating surface W1, that is, a state parallel to the screw hole W2.

Subsequently, the controller 102 searches for the screw hole W2 by operating the robot arm 101 to, while bringing the entire surface of the tip of the guide 17 into contact with the screw mating surface W1, slide the tip on the screw mating surface W1. Specifically, the controller 102 determines that the tip of the screw engaged with the bit 27A has arrived at the screw hole W2 by detecting that the force F1 equal to or greater than the predetermined first threshold has occurred, via the force sensor 16 (see FIG. 10).

When the controller 102 detects that the tip of the screw engaged with the bit 27A has arrived at the screw hole W2, the controller 102 stops the movement of the robot arm 101. Subsequently, the controller 102 rotates the screwing shaft 27 via the support plate 21 by driving the motor 12 to rotate the motor shaft 12A. As a result, the screw engaged with the bit 27A on a lower side of the rotating screwing shaft 27 is urged toward a screw hole W2 side by the urging force of the compression coil spring 25 to be tightened into this screw hole W2. Thereafter, the controller 102, after stopping the motor 12, operates the robot arm 101 to move the robot tool 11 in a Z-axis positive direction, and ends the screwing operation.

As described in detail above, the robot tool 11 in accordance with the present embodiment makes it possible to make the gauge shaft 15 or the screwing shaft 27 orthogonal to the screw mating surface W1 by reducing the moment M applied from the screw mating surface W1 to the tip of the guide 17 to nearly zero via the force sensor 16, even if an angle of the screw mating surface W1 is slightly shifted. As a result, the screw hole W2 can be searched for with use of the gauge shaft 15 or the screwing shaft 27 by sliding the tip of the guide 17 on the screw mating surface W1 via the tip portion of the robot arm 101. Further, it is possible to align a screw or the gauge 15A with the screw hole W2 by detecting that the tip of the screw or the gauge 15A has arrived at the screw hole, with use of the force sensor 16.

Further, the robot tool 11, in which the motor 12, the guide 17, and the force sensor 16 can be applied to the base plate 13, makes it possible to reduce manufacturing costs with a simple configuration.

In the robot tool 11, when the entire surface of the tip of the guide 17 is brought into contact with the screw mating surface W1, the gauge shaft 15 or the screwing shaft 27 is urged toward the screw mating surface W1 by the compression coil spring 25. As a result, the gauge shaft 15 or a screw is brought into contact with the screw hole W2 while being urged toward the screw mating surface W1, and thus it is possible to detect that the gauge 15A or the screw has been aligned with the screw hole W2, with use of the force sensor 16.

The shaft portion 15B or 27B of the gauge shaft 15 or the screwing shaft 27 is fitted into the through hole 21A of the support plate 21, so that the shaft portion 15B or 27B can be accommodated so as to be raisable and lowerable while being coaxial with the motor shaft 12A. Further, the rotation of the motor shaft 12A can be reliably transmitted to the gauge shaft 15 or the screwing shaft 27. The clearance grooves 21B each having a semicircular cross section which are formed at the respective corner portions of the through hole 21A make it possible to prevent a situation where the corner portions of the shaft portion 15B or 27B of the gauge shaft 15 or the screwing shaft 27 collide with the inner peripheral surface of the through hole 21A thereby making insertion of the shaft portion 15B or 27B impossible. Further, it is possible to smoothly raise and lower the gauge shaft 15 or the screwing shaft 27.

The stopper 23 provided at the upper end portion of the shaft portion 15B or 27B of the gauge shaft 15 or the screwing shaft 27 is brought into contact from above with the retaining rib 12E formed on the inner peripheral surface of the shaft hole of the motor shaft 12A. This makes it possible to prevent the gauge shaft 15 or the screwing shaft 27 from coming out of the motor shaft 12A as well as to prevent the gauge shaft 15 or the screwing shaft 27 from being inclined with respect to the motor shaft 12A.

[Variation 1]

The tip of the guide 17 is formed into the surface orthogonal to an axial direction of the motor shaft 12A in the above embodiment, but may be formed into a surface obliquely crossing an axial direction of the motor shaft 12A. Even with respect to a screw hole W2 formed to be inclined with respect to the screw mating surface W1 of the workpiece W by a predetermined angle, this allows the gauge shaft 15 or the screwing shaft 27 to be set to a state parallel to the screw hole W2 by bringing the entire surface of the tip of the guide 17 into contact with the screw mating surface W1. As a result, even with respect to the screw hole W2 formed to be inclined with respect to the screw mating surface W1 of the workpiece W by a predetermined angle, it is possible to fit the gauge 15A or a screw into the screw hole W2 with the gauge 15A or the screw set to a state parallel to the screw hole W2.

[Variation 2]

For example, the gauge shaft 15 may have a gauge 15A only on a one end side of the shaft portion 15B. The screwing shaft 27 may have a bit 27A only on a one end side of the shaft portion 27B.

[Variation 3]

For example, it is also possible to configure each of the gauges 15A to have, on a one end side thereof, an attachment screw thinner than the outer diameter of the gauge 15A and attach the gauges 15A by tightening into attachment screw holes formed at the both end portions of the shaft portion 15B. This enables the gauges 15A to be easily replaced in accordance with the screw hole W2. It is also possible to configure each of the bits 27A to have, on a base end portion side thereof, an attachment screw thinner than the outer diameter of the bit 27A and attach the bits 27A by tightening into attachment screw holes formed at the both end portions of the shaft portion 27B. This enables the bits 27A to be easily replaced in accordance with the screw to be tightened into the screw hole W2.

[Variation 4]

For example, the retaining rib 12E in the motor shaft 12A may not be provided. In this case, the stopper 23 fixed to the upper end portion of the shaft portion 15B of the gauge shaft 15 is brought into contact with the support plate 21, so that it is possible to prevent the gauge shaft 15 from coming out of the through hole 21A. Further, the stopper 23 fixed to the upper end portion of the shaft portion 27B of the screwing shaft 27 is brought into contact with the support plate 21, so that it is possible to prevent the screwing shaft 27 from coming out of the through hole 21A.

[Variation 5]

For example, the outer peripheral surfaces of the gauges 15A of the gauge shaft 15 may be threaded to be able to be tightened into the screw hole W2. According to this, the movement of the robot arm 101 is stopped when it is detected that the tip of the gauge 15A has arrived at the screw hole W2 while the entire surface of the tip of the guide 17 is being brought into contact with the screw mating surface W1, as illustrated in FIG. 10. Subsequently, the controller 102 rotates the gauge shaft 15 via the support plate 21 by driving the motor 12 to rotate the motor shaft 12A.

As a result, the screw on the outer peripheral surface of the gauge 15A on a lower side of the rotating gauge shaft 15 is urged toward the screw hole W2 side by the urging force of the compression coil spring 25 and is tightened into this screw hole W2 (see FIG. 11). Afterward, the controller 102, after stopping the motor 12, operates the robot arm 101 to, while bringing the entire surface of the tip of the guide 17 into contact with the screw mating surface W1, slightly slide the tip.

When the controller 102 detects a force F2 equal to or greater than a predetermined second threshold via the force sensor 16, the controller 102 determines that the gauge 15A has been tightened into the screw hole W2, and stops the robot arm 101. Afterward, the controller 102 may, after rotating the motor 12 in reverse to take the gauge 15A out of the screw hole W2, operate the robot arm 101 to move the robot tool 11 in a Z-axis positive direction, and end the fitting operation. This enables the controller 102 to inspect the screw hole W2 of the workpiece W with use of the gauge 15A.

ADDITIONAL REMARKS

The present disclosure is not limited to the embodiment and the variations above, but can be altered by a skilled person in the art within the scope of the claims. The present disclosure also encompasses, in its technical scope, any embodiment derived by combining technical means disclosed in the embodiment and the variations as appropriate.

Aspects of the present invention can also be expressed as follows:

A robot tool in accordance with Aspect 1 includes: a shaft member provided with, at at least one end thereof, a gauge configured to inspect a diameter of a screw hole or a bit configured to tighten and loosen a screw; a motor accommodating, in a motor shaft thereof that has a cylindrical shape, the shaft member so that the shaft member is raisable and lowerable; a guide that is disposed so as to enable the shaft member to be inserted thereinto and that has a tip to be brought into contact with a screw mating surface, the guide having a tubular shape; and a force sensor configured to detect a moment applied from the screw mating surface to the guide when part of the tip of the guide is brought into contact with the screw mating surface.

According to the robot tool in accordance with Aspect 1, even if an angle of a screw mating surface is slightly shifted, the shaft member can be set at a predetermined angle with respect to the screw mating surface, e.g., can be set to be orthogonal to the screw mating surface, by reducing a moment applied from the screw mating surface to the tip of the guide to nearly zero via the force sensor. As a result, the screw hole can be searched for with use of the shaft member by sliding the tip of the guide on the screw mating surface via a tip portion of a robot arm. Further, it is possible to align a screw or a gauge with a screw hole by detecting that the tip of the screw or the gauge has arrived at the screw hole, with use of a force sensor.

Aspect 2 is a robot tool in accordance with Aspect 1 which may further include a base plate that is provided with the motor disposed on a surface of the base plate which surface is located opposite to a screw mating surface side and that has a first through hole into which the motor shaft is inserted, the guide being attached to a surface of the base plate which surface is located on the screw mating surface side, the force sensor being attached between the surface of the base plate which surface is located opposite to the screw mating surface side and a tip portion of a robot arm.

The robot tool in accordance with Aspect 2, in which the motor, the guide, and the force sensor can be applied to the base plate, makes it possible to reduce manufacturing costs with a simple configuration.

Aspect 3 is the robot tool in accordance with Aspect 1 or 2 which may further include an urging member configured to urge the shaft member toward the screw mating surface when the tip of the guide is brought into contact with the screw mating surface.

According to the robot tool in accordance with Aspect 3, when the tip of the guide is brought into contact with the screw mating surface, the shaft member is urged toward the screw mating surface by the urging member. As a result, the gauge or the screw is brought into contact with the screw hole while being urged toward the screw mating surface, so that it is possible to detect that the gauge or the screw has been aligned with the screw hole, with use of the force sensor.

A robot tool in accordance with Aspect 4 is the robot tool in accordance with any one of Aspects 1 to 3 which may be configured so that the shaft member has a shaft portion having a polygonal cross section, the motor shaft has a support plate attached to an end surface of the motor shaft which surface is located on a screw mating surface side, and the support plate has, at a center portion thereof, a second through hole which is formed so as to be coaxial with the motor shaft and into which the shaft portion is inserted so as to be slidable in a longer side direction, the second through hole supporting the shaft portion so as to prevent the shaft portion from rotating.

According to the robot tool in accordance with Aspect 4, the shaft portion of the shaft member is inserted into the second through hole of the support plate, so that it is possible to reliably transmit rotation of the motor shaft to the shaft member as well as to accommodate the shaft portion so that the shaft portion is raisable and lowerable while being coaxial with the motor shaft.

Aspect 5 is the robot tool in accordance with Aspect 4 which may be configured so that the second through hole is formed so as to be a through hole which has a polygonal shape when seen from front and into which the shaft portion is fitted, and the second through hole has clearance grooves recessed to have cross sections having U shapes outwardly in a radial direction from respective corner portions of an inner peripheral surface of the second through hole throughout a thickness of the support plate.

According to the robot tool in accordance with Aspect 5, the clearance grooves each having a U-shaped cross section which are formed at the respective corner portions of the second through hole make it possible to prevent a state in which the corner portions of the shaft portion of the shaft member are pressed against the second through hole and cannot be slid. This makes it possible to smoothly raise and lower the shaft member.

The invention claimed is:

1. A robot tool comprising:

a shaft member provided with, at at least one end thereof, a gauge configured to inspect a diameter of a screw hole or a bit configured to tighten and loosen a screw;

a motor accommodating, in a motor shaft thereof that has a cylindrical shape, the shaft member so that the shaft member is raisable and lowerable;

a guide that is disposed so as to enable the shaft member to be inserted thereinto and that has a tip to be brought into contact with a screw mating surface, the guide having a tubular shape; and a force sensor configured to detect a moment applied from the screw mating surface to the guide when part of the tip of the guide is brought into contact with the screw mating surface.

2. The robot tool according to claim 1, further comprising a base plate that is provided with the motor disposed on a surface of the base plate which surface is located opposite to a screw mating surface side and that has a first through hole into which the motor shaft is inserted, the guide being attached to a surface of the base plate which surface is located on the screw mating surface side, the force sensor being attached between the surface of the base plate which surface is located opposite to the screw mating surface side and a tip portion of a robot arm.

3. The robot tool according to claim 1, further comprising an urging member configured to urge the shaft member toward the screw mating surface when the tip of the guide is brought into contact with the screw mating surface.

4. The robot tool according to claim 2, further comprising an urging member configured to urge the shaft member toward the screw mating surface when the tip of the guide is brought into contact with the screw mating surface.

5. The robot tool according to claim 1, wherein the shaft member has a shaft portion having a polygonal cross section, the motor shaft has a support plate attached to an end surface of the motor shaft which surface is located on a screw mating surface side, and the support plate has, at a center portion thereof, a second through hole which is formed so as to be coaxial with the motor shaft and into which the shaft portion is inserted so as to be slidable in a longer side direction, the second through hole supporting the shaft portion so as to prevent the shaft portion from rotating.

6. The robot tool according to claim 5, wherein the second through hole is formed so as to be a through hole which has a polygonal shape when seen from front and into which the shaft portion is fitted, and the second through hole has clearance grooves recessed to have cross sections having U shapes outwardly in a radial direction from respective corner portions of an inner peripheral surface of the second through hole throughout a thickness of the support plate.

7. The robot tool according to claim 2, wherein the shaft member has a shaft portion having a polygonal cross section, the motor shaft has a support plate attached to an end surface of the motor shaft which surface is located on the screw mating surface side, and the support plate has, at a center portion thereof, a second through hole which is formed so as to be coaxial with the motor shaft and into which the shaft portion is inserted so as to be slidable in a longer side direction, the second through hole supporting the shaft portion so as to prevent the shaft portion from rotating.

8. The robot tool according to claim 7, wherein the second through hole is formed so as to be a through hole which has a polygonal shape when seen from front and into which the shaft portion is fitted, and the second through hole has clearance grooves recessed to have cross sections having U shapes outwardly in a radial direction from respective corner portions of an inner peripheral surface of the second through hole throughout a thickness of the support plate.

* * * * *